United States Patent

Haapoja et al.

[15] 3,648,446
[45] Mar. 14, 1972

[54] LAWN MOWER WITH CLEANING MEANS

[72] Inventors: Raymond E. Haapoja, Route 2, Mora, Minn. 55051; Patrick Shettler, Box 232, Ogilvie, Minn. 56358

[22] Filed: Dec. 11, 1970

[21] Appl. No.: 97,280

[52] U.S. Cl. ............................. 56/320.2, 56/16.8, 239/273
[51] Int. Cl. ..................................................... A01d 55/18
[58] Field of Search .................. 56/229, 255, 320.1, 320.2, 56/16.8, DIG. 5, 12.1; 239/273, 275, 500, 556

[56] References Cited

UNITED STATES PATENTS

| | | |
|---|---|---|
| 2,936,563 | 5/1960 | Blume......................................56/12.1 |
| 2,984,061 | 5/1961 | Stabnau..................................56/320.1 |
| 2,992,524 | 7/1961 | Stabnau..................................56/320.1 |
| 3,040,990 | 6/1962 | Gotti............................................239/273 |
| 3,214,893 | 11/1965 | Griffin......................................56/320.2 |
| 3,490,212 | 1/1970 | Hengesbach............................56/16.8 |
| 3,535,862 | 10/1970 | Wittwer....................................56/17.5 |

*Primary Examiner*—Russell R. Kinsey
*Attorney*—James R. Haller

[57] ABSTRACT

A lawn mower having a housing and a rotating blade housed therewithin, the housing being provided with a perforated conduit as a portion of its inner surface. Water under pressure is forced through the conduit and exits through the perforations therein, flushing lawn trimmings from the inner surface of the housing.

8 Claims, 5 Drawing Figures

PATENTED MAR 14 1972

3,648,446

INVENTORS
RAYMOND E. HAAPOJA
PATRICK SHEFFLER
BY James R. Haller
ATTORNEY

LAWN MOWER WITH CLEANING MEANS

This invention relates to rotary power mowers and more particularly relates to the cleaning of lawn trimmings from the undersurface of such mowers.

Rotary lawn mowers, powered by gasoline engines or electric motors, are in common usage and normally include a generally circular housing member which houses a centrally located, rotatable blade. A portion of the sidewall of the housing is conventionally formed into a chute through which lawn trimmings are discharged by the rapid rotation of the blade.

Adherence of lawn trimmings to the undersurface (interior surface) of the housing has long been an annoying problem. Adherence of such lawn trimmings is especially noticable when the grass being cut is damp. Upon drying, portions of the lawn trimmings may fall to the floor and litter the storage area in which the lawn mower is stored. Of greater importance, heavy accumulation of the adhered trimmings will reduce the efficiency of the mower unless the trimmings are periodically cleaned from the undersurface of the mower housing.

The possibility of accidental restarting of the engine or motor during manual cleaning of the undersurface of the mower housing presents potential dangers for the mechanically unskilled. Moreover, manual cleaning is not always feasible for the rather large mowers often utilized by local governmental bodies to trim grass in parks and along highways.

A number of solutions to the problem of removing lawn trimmings from the undersurfaces of lawn mower housings have been proposed which avoid manual cleaning by employing water under pressure as the cleaning medium. U.S. Pat. No. 3,040,990 relates to a water-spraying device which can be attached to the rearmost wall of a lawn mower housing. The water which is discharged into the housing interior is propelled by the rapidly rotating blade onto the accumulated grass clippings which are to be washed away. U.S. Pat. No. 3,214,893 relates to a device including series of nozzles which are disposed within the housing interior and protrude from the undersurface of the top wall of the housing. The water which issues from the nozzles is sprayed against the undersurface of the accumulated grass clippings and additionally is propelled against the grass clippings by the force of the rapidly rotating blade for the purpose of dislodging and washing the clippings away. Each of the so-described devices relies upon the rotating cutting blade to propel water against the outer surface of the mat of grass clippings. The grass and other foreign matter (e.g., pieces of wire, etc.) which are dislodged from the housing are thus ordinarily propelled through the discharge chute at high velocity, presenting another source of danger. Moreover, the nozzles which protrude from the undersurface of the mower housing as described in U.S. Pat. No. 3,214,893 may serve as obstructions about which matted grass clippings may accumulate.

It is therefore an object of the invention to provide a cleaning means for a rotary lawn mower which does not require rotary movement of the mower blade during the cleaning operation.

A second object of the invention is to provide a cleaning means for a rotary lawn mower which does not require impingement of water upon the outer surface of matted grass clippings within the mower housing.

Yet a third object of the invention is to provide a method for cleaning the undersurface of a mower housing with water under pressure while the cutting blade, for safety reasons, is motionless.

Briefly, the present invention relates to a cleaning means for removing adhered lawn trimmings from the inner surface of a rotary lawn mower, and to a method for its use. The cleaning means comprises a conduit which is disposed within the housing as at least a portion of the inner surface thereof. The conduit is adapted to carry water under pressure, and includes a plurality of perforations therein. The perforations are positioned to discharge the water under pressure from the conduit into the interior of the housing from points along the inner housing surface so as to flush the lawn trimmings therefrom. As such, the water under pressure forces the lawn trimmings away from the inner surface of the housing. Thus, although the action of the rotary blade may be useful to hasten the cleaning operation, it is not necessary that the blade rotate during this operation, and for reasons of safety, the mower can thus be shut off during cleaning.

Figure 1:
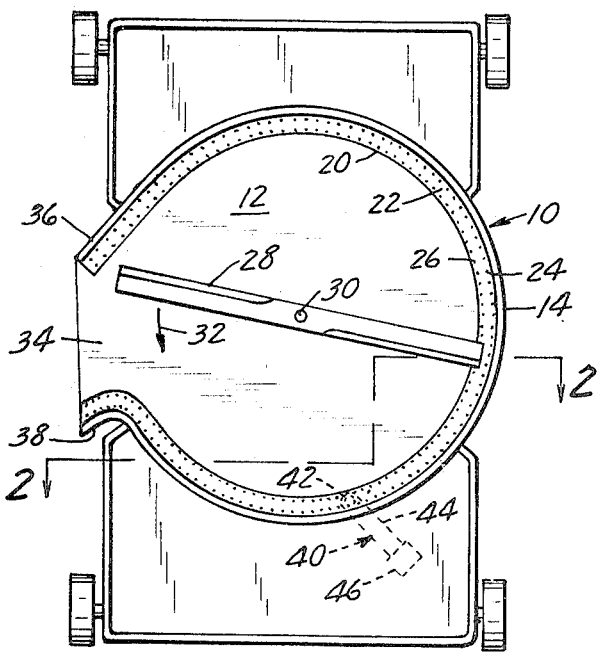
FIG. 1 is a bottom view of a rotary mower of the invention.
Figure 2:
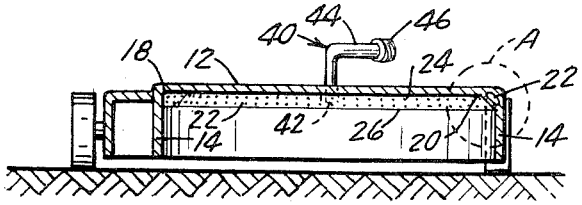
FIG. 2 is a side view, shown partially in cross section taken across lines 2—2 of FIG. 1.

Referring now to FIGS. 1 and 2, a rotary lawn mower is shown having a housing 10 which includes top and side walls denoted by 12 and 14, respectively, which walls are joined at 16. During manufacture, the top and sidewalls may be formed as a continuous casting or stamping, and are more readily seen in FIGS. 3-5. The inner junction of the top (12) and side (14) walls is denoted as 18 in FIG. 2, and it is within this corner or crevice 18 that large quantities of lawn trimmings accumulate. Disposed within the housing 10 as at least a portion 20 of the inner surface thereof is a conduit 22 having perforations (exemplified as 24 and 26) therein. The preferred embodiment, as depicted, employs a conduit extending about the inner periphery of the top wall (i.e., in registration with at least a portion of the length of the joint between the top and sidewalls). It is contemplated, however, that such conduit 22, or a plurality of conduits, may be placed elsewhere in the housing, provided that the conduits at least in part form at least a portion of the inner surface of the housing, the reason for which will be more fully explained below. Centrally located within the housing is the power driven cutting blade 28 which is driven about its axis 30 in the direction indicated by the arrow 32 by a power source (not shown) such as a gasoline engine or electric motor. The housing is provided with a chute 34 through which lawn trimmings are discharged during the lawn-mowing operation.

Figure 3:
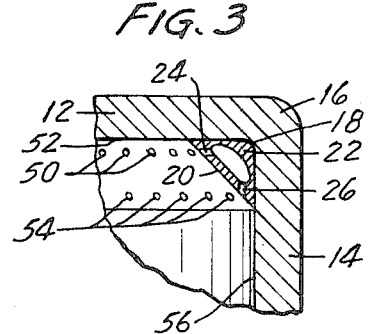
FIGS. 3 is an enlarged, partial cross-sectional view of the circled portion denoted by "A" of FIG. 2.
Figure 4:
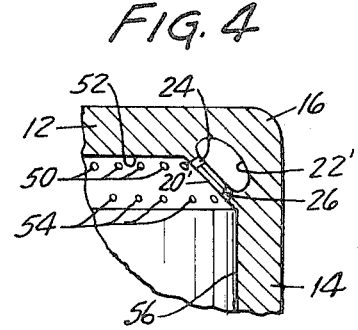
FIG. 4 is a view similar to FIG. 3 but showing another embodiment of the conduit structure.
Figure 5:
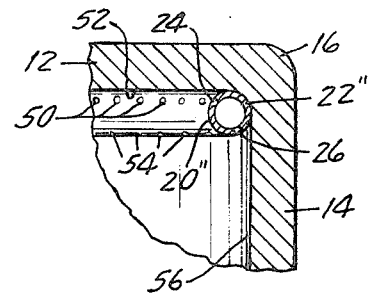
FIG. 5 is another view similar to FIGS. 3 and 4 but showing still another embodiment of the conduit structure.

For ease of fabrication, it is desired that the conduit 22 be easily installed in the stamped or otherwise formed mower housing 10. Thus, FIG. 3 represents a preferred embodiment wherein the conduit 22 is formed as a separate part during the manufacturing procedure, and is subsequently connected (e.g., by welding or the like) to the inner surface of the mower housing to itself form a portion of the inner surface. In another embodiment, depicted in FIG. 4, the conduit 22 is formed as an integral part of the mower housing and has an inner surface 20' which constitutes a portion of the inner surface of the mower housing. This embodiment is contemplated as being especially useful in mowers having molded housings of tough plastic material such as polycarbonate. Yet a third embodiment is shown in FIG. 5 of the drawing wherein the conduit 22" having an outer surface 20" is formed of a tubular material, such as copper. In this embodiment, it is highly desirably that the tubing conform very closely to the shape of the inner surface of the housing, as shown in FIG. 5, so as to itself become essentially a portion of the inner housing surface. It will be appreciated that the conduits pictured in the drawing are of substantially uniform cross section along their lengths, and that the conduits of FIGS. 3 and 5 are adapted to be affixed to the housing after the housing has been formed. It is contemplated that such conduits may be removably affixed to the housing by bolts or the like (not shown) so that the housing may be readily disassembled for repair.

As stated above, it is preferred that the conduit be positioned in substantial registration with at least a portion of the length of the joint between the top and sidewalls. It is further desirable that the conduit extend at least partially into the chute 34 (as shown at 36 and 38 of FIG. 1) so as to permit the removal of lawn trimmings from the inner surfaces of the chute. A water supply tube 40 is provided to connect the conduit 22 to a suitable source of water under pressure. One end 42 of the water supply tube is connected into the conduit, e.g., by welding. The other end 44 of the water supply tube extends through preferably the top wall 12 of the mower housing and terminates in a connection 46 which is adapted for coupling to a source of water under pressure, such as a garden hose. The connector may contain a filter (not shown) for removal of foreign matter from the water supply.

The conduit 22 bears a series of perforations (exemplified as 24 and 26) for discharge of the water under pressure which is carried by the conduit. These perforations are positioned so as to discharge the water under pressure into the interior of the housing from the points along the inner housing surface where the perforations are located. The lawn trimmings which accumulate are thus pushed away from the housing surface by the water under pressure which is discharged through the perforations in the conduit. Accordingly, it will be appreciated that the conduit itself must form at least a portion of the inner housing surface so that the perforations in the conduit will permit water under pressure to be directed between the housing inner surface and the matted lawn trimmings. The closely fitted tubular conduit 22″ depicted in FIG. 5 is thus considered to be a portion of the inner housing surface, since the perforations therein permit water to be directed between the matted grass clippings and the inner housing surface.

Thus, in contrast to the cleaning method wherein jets of water are propelled against the outer surface of matted lawn trimmings which adhere to the inner surface of the housing (which process requires that the mower be running), the present invention operates by providing water pressure between the matted lawn trimmings and the inner surface of the housing, thus avoiding the necessity of running the lawn mower during the cleaning operation. It is understood, of course, that the cleaning operation may be hastened by running the mower during the cleaning operation. Excellent results have been obtained with mowers of the invention, however, by safely shutting off the power source (e.g., by disconnecting a spark plug wire) prior to cleaning.

To insure uniform cleaning of the inner housing surface, it is desirable that the water pressure in the conduit remain uniform during the cleaning operation. This is readily accomplished by judicious selection of the conduit diameter and the diameter and number of the perforations therein. For rotary lawn mowers of the type ordinarily utilized in households (e.g., having a total blade length of about 20 inches), a conduit having a cross section equivalent in area to that of one-half inch inner diameter circular tubing yields satisfactory results when utilized with perforations approximately one thirty-second of an inch in diameter, as described below with reference to FIG. 5. Larger lawn mowers, of course, may require somewhat larger conduits. The required sizes of the conduits and perforations therein, and the number of perforations, can be estimated mathematically using well-known fluid-flow principles. The inner housing surface 20, 20′ which is presented by the conduit wall is depicted in FIGS. 3 and 4 as being substantially flat in cross section. Although such configuration is desired for ease of fabrication, such surface may also be concave, or convex as shown in FIG. 5.

The perforations preferably are arranged in rows along the length of the conduit and are positioned so as to provide control over the direction of the jets of water discharged therethrough. In the most preferred embodiment, two rows of perforations are employed. Referring to FIG. 3, the conduit 22 is positioned in substantial registration with at least a portion of the length of the joint 16 between the top and sidewalls, the conduit thus presenting a portion 20 of the inner housing surface. The upper row 50 of perforations is adapted to direct a spray of water under pressure in a direction generally parallel to the inner surface of the top wall 52, whereas the lower row 54 of perforations is adapted to direct water in a direction substantially parallel to the inner surface of the sidewall 56. In this embodiment, the water under pressure which is discharged through the perforations is able to flush matted lawn trimmings from the inner surface of the mower housing at a distance from the perforations themselves. Further, it is contemplated that the thus-described directional aspect of the perforations helps to avoid clogging of the perforations with grass during the grass mowing operation.

It has further been found that an unusually large number of perforations per unit area is not required for success of the invention. For example, using the embodiment of FIG. 5 (one thirty-second inch diameter perforations), good results can be achieved if the top and bottom rows of perforations are separated by about three-eighths inch and the individual perforations in each row are separated by 1 inch. It is preferred that the spacing between individual perforations not exceed 1-½ inches, however.

What we claim is:

1. In a lawn mower having a housing and a rotatable blade housed therewithin, cleaning means for removing adhered lawn trimmings from the inner surface of said housing, said cleaning means comprising a conduit disposed within said housing as at least a portion of the inner surface thereof, said conduit being adapted to carry water under pressure and having a plurality of perforations therein positioned to discharge said water under pressure into the interior of said housing along and substantially parallel to inner surfaces thereof from points along said inner surfaces so as to flush said lawn trimmings therefrom.

2. The lawn mower of claim 1 wherein said housing includes joined top and sidewalls and wherein said conduit is positioned as a portion of the inner surface of said housing in registration with at least a portion of the length of the joint between the top and sidewalls.

3. The lawn mower of claim 2 wherein said perforations are arranged in rows along the length of said conduit, at least two of said rows of perforations being adapted respectively to direct water under pressure in directions generally parallel to the inner surfaces of said top and sidewalls.

4. The lawn mower of claim 1 additionally comprising a water supply tube, one end of which is connected to said conduit and the other end of which extends exteriorly of said housing and is adapted for connection to a source of water under pressure.

5. The lawn mower of claim 1 wherein said housing includes joined top and sidewalls and wherein said conduit comprises a perforated water pipe positioned contiguous to said walls along at least a portion of the joint therebetween so as to itself form a portion of the inner surface of said housing.

6. In a lawn mower having a housing and a rotatable blade housed therewithin, said housing including joined top and sidewalls, cleaning means for removing adhered lawn trimmings from the inner surface of said housing comprising a. a conduit disposed about said housing in substantial registration with at least a portion of the length of the joint between said top and sidewalls and as a portion of the inner surface of said housing, said conduit being adapted to carry water under pressure and having a plurality of perforations arranged along its length in rows so positioned as to direct said water under pressure from said conduit interiorly of said housing from points along said inner surface thereof, at least two of said rows of conduits being adapted respectively to direct water under pressure in direction generally parallel to the inner surfaces of said top and sidewalls; and b. a water supply tube connected at one end to said conduit, the other end of said tube extending exteriorly of said housing and terminating in a connection adapted for coupling to a source of water under pressure.

7. The lawn mower of claim 6 wherein said conduit and perforations are mutually sized so as to maintain substantially uniform water pressure throughout said conduit when water under pressure is directed into said water supply tube.

8. The lawn mower of claim 7 wherein said perforations are about one thirty-second of an inch in diameter.

* * * * *

UNITED STATES PATENT OFFICE
CERTIFICATE OF CORRECTION

Patent No. 3,648,446                      Dated March 14, 1972

Inventor(s) Raymond E. Haapoja and Patrick Sheffler

It is certified that error appears in the above-identified patent and that said Letters Patent are hereby corrected as shown below:

On the title page, the name of the second-listed inventor should be

Patrick Sheffler

Signed and sealed this 5th day of September 1972.

(SEAL)
Attest:

EDWARD M. FLETCHER, JR.  
Attesting Officer

ROBERT GOTTSCHALK  
Commissioner of Patents